Aug. 27, 1935.   A. Y. DODGE   2,012,659
BRAKE
Original Filed Dec. 3, 1928
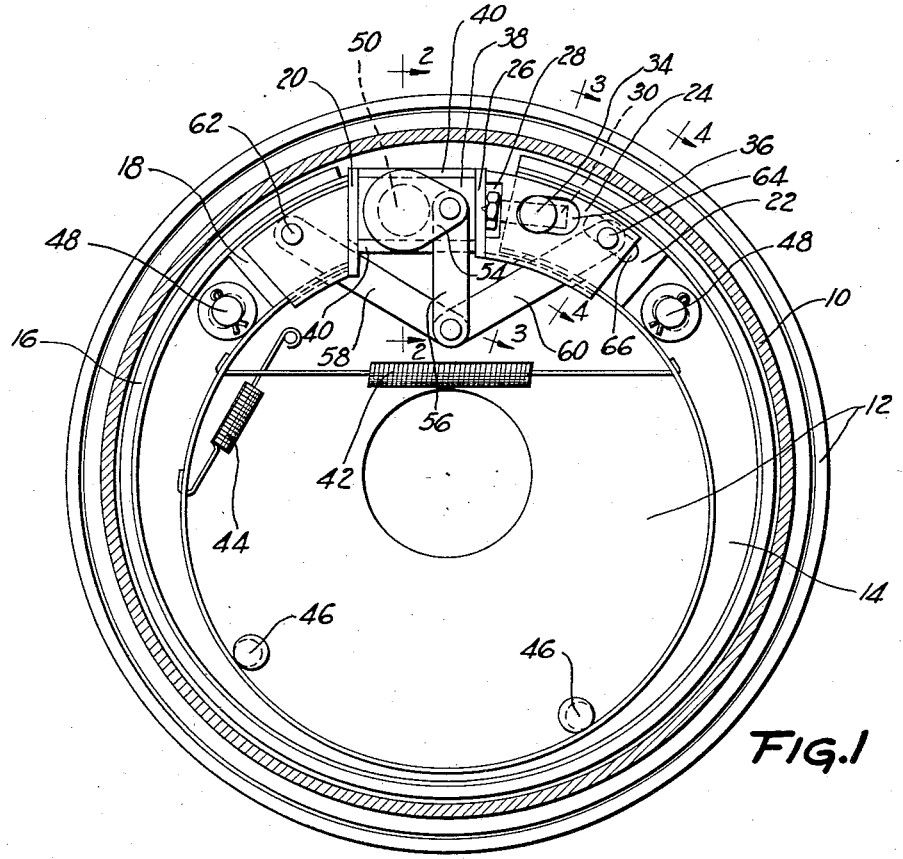
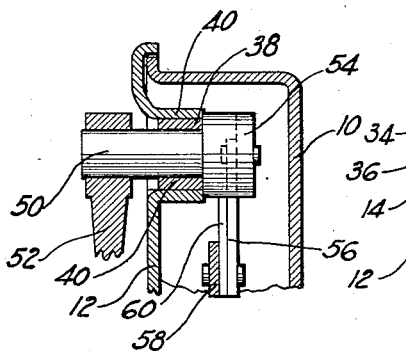
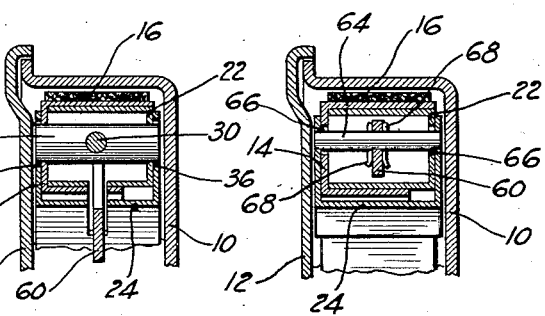
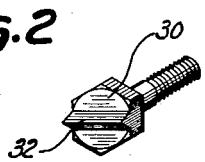
INVENTOR.
ADIEL Y. DODGE
BY
ATTORNEYS.

Patented Aug. 27, 1935

2,012,659

UNITED STATES PATENT OFFICE 2,012,659

BRAKE

Adiel Y. Dodge, South Bend, Ind., assignor, by mesne assignments, to Bendix Brake Company, South Bend, Ind., a corporation of Illinois Original application December 3, 1928, Serial No. 323,229. Divided and this application November 4, 1932, Serial No. 641,270

8 Claims. (Cl. 188—78)

This invention relates to brakes, and is illustrated as embodied in an internal expanding automobile brake of the shiftable-anchorage type.

An object of the invention is to provide a simple and inexpensive friction band or the like for such a brake provided with means for limiting or controlling its self-energizing or self-wrapping effect, this being of especial importance in a brake so arranged that the band anchors at one end when the drum is turning in one direction and at the other end when the drum is turning in the other direction.

The band or its equivalent is arranged to have considerable flexibility at its center, and to be relatively rigid adjacent its ends, for example being a channel-section sheet-steel stamping with a gradually tapered stiffening portion. I prefer that the channel be arranged with its base adjacent and paralleling the backing plate of the brake, this base being tapered in width as described above to give the desired varying flexibility, and with the side walls of cylindrical form and the outer one paralleling the inside of the brake drum. When so arranged, the inner channel wall is of course eccentric with respect to the outer one.

One feature of the invention relates to the further reinforcement of the ends of the band by yokes, shown as short channel-shaped stampings, which may telescope over and embrace the ends of the band, forming what may be called box sections at the ends.

Another feature of the invention relates to a novel anchor construction especially suited to brakes of the type discussed above, and including a stationary anchor block secured between two parallel flanges on the backing plate. Preferably this block serves as a bearing in which is journaled a shaft forming part of a novel brake-applying mechanism which is shown as including a toggle connected in an improved manner to the ends of the above-described band.

The above and other objects and features of the invention, including various novel details of construction and desirable particular constructions, will be apparent from the following description of the illustrative embodiment shown in the accompanying drawing, in which:

Figure 1 is a vertical section through the brake, just inside the head of the brake drum, and showing the novel band in side elevation;

Figure 2 is a partial section on the line 2—2 of Figure 1, showing the mounting of the brake-applying shaft;

Figure 3 is a partial section on the line 3—3 of Figure 1, showing the adjustable one of the above-described box-section ends;

Figure 4 is a similar partial section on the line 4—4 of Figure 1; and

Figure 5 is a perspective view of the adjusting screw.

In the illustrated embodiment of the invention, the brake includes a rotatable drum 10, at the open side of which is a support such as a backing plate 12, and within which is arranged the friction means of the brake.

According to an important feature of the invention, the friction means includes a novel band 14, of channel form, having a base paralleling the backing plate and in effect forming the stiffening web of the band and which is tapered in width, being wider at the ends of the band than at the center. The side walls of the channel may both be cylindrical, as shown, in which case the inner one is eccentric with respect to the outer one, the outer one being faced with the usual friction lining 16 and being substantially parallel to the inner face of the drum when the brake is released and being in engagement therewith when the brake is applied.

The ends of the band, already quite rigid because of the construction described above, are made more rigid by channel-shaped reinforcements telescoped over or into them.

The clockwise (left) end, in Figure 1, is shown with a channel-section reinforcement 18 in the form of a steel stamping, shown with its base outward in Figure 1 and with its side walls engaging and welded or otherwise secured to the ends of the respective side walls of the channel band 14. A thrust member 20, intended for engagement with the brake anchor, may be welded to this end of the band. The other end is shown with a similar reinforcement 22 telescoped between and welded to the side walls of the channel 14.

This latter end of the band is provided also with an adjustable outwardly-facing channel member 24 and embracing the box-section formed as described above, and provided with an anchor-engaging thrust plate 26 welded to its end. This adjustable member is formed with openings 28 affording access to the head of an adjusting screw 30 (shown with a tooth 32 normally seated in a locking notch in plate 26). The screw 30 is threaded into a transverse pin 34 mounted at its ends in the bases of channels 14 and 22, the walls of channel 24 having openings 36 to clear it. This adjustment is claimed in my parent application No. 323,229, filed December 3, 1928, of which the present application is a division.

The plates 20 and 26 are held, when the brake is released, against the opposite ends of a novel anchor formed by welding a rectangular anchor plate 38 between parallel flanges 40 pressed inwardly from the backing plate, the plate 38 and flanges 40 jointly forming the anchor. Plates 20 and 26 are held against the ends of this anchor by suitable return springs 42 and 44 cooperating with adjustable eccentric stops or the like 46 and with any desired type of steady rests 48.

The brake is shown as being applied by novel toggle means which may include a shaft 50 journaled in the anchor plate 38 and operated by an arm 52 outside the brake. The inner end of the shaft is forged or otherwise provided with an arm 54, pivoted to a link 56 connected by a pivot pin to the knuckle of an upwardly-opening toggle comprising links 58 and 60. Link 58 extends through openings in the lower sides of channels 14 and 18, and has its upper end pivoted on a transverse pin 62 arranged with its ends mounted in the bases of channels 18 and 14.

Link 60 extends through openings in the lower portions of channels 14, 22, and 24, and has its upper end pivoted on a transverse pin 64 passing through slots 66 in the bases of channels 14 and 22, and mounted in the opposite side walls of the channel 24. As shown in Figure 4, means such as cotter pins 68 may be provided to center links 58 and 60 on the pins 62 and 64.

In operation, the rocking of shaft 34 operates through the toggle 58—60 to expand band 14 and apply the brake, the braking torque being transmitted to the anchor by plate 20 when the drum is turning clockwise and by pin 34 and screw 30 and plate 26 when the drum is turning counter-clockwise.

While one illustrative embodiment has been described in detail, it is not my intention to limit the scope of the invention to that particular embodiment, or otherwise than by the terms of the appended claims.

I claim:

1. A brake comprising a backing plate having parallel flanges pressed therefrom, an anchor plate secured between said flanges and with said flanges forming a brake anchor, a channel-section friction band having the base of the channel adjacent and parallel the backing plate and provided at its ends with parts engaging said anchor, and applying means acting on said band and including a shaft journaled in said plate.

2. A brake comprising a backing plate having parallel flanges pressed therefrom, an anchor plate secured between said flanges and with said flanges forming a brake anchor, and a channel-section friction band having the base of the channel adjacent and parallel the backing plate and provided at its ends with parts engaging said anchor.

3. A brake backing plate having parallel flanges pressed therefrom and a generally rectangular anchor plate secured between said flanges.

4. A brake backing plate having flanges pressed therefrom and an anchor plate secured between said flanges.

5. A brake band having box-section ends, transverse pins mounted in said ends, and an operating linkage having parts extending into said ends and pivoted on said pins.

6. A brake comprising, in combination, a rotatable drum, a floating friction device within said drum having spaced apart ends, a fixed anchor arranged between said ends, said device comprising a channel-sectioned body portion reinforced at each of its ends by a supplemental channel-shaped yoke member telescoping the body portion.

7. A brake comprising, in combination, a brake support, a rotatable drum, a channel-shaped band-like friction device within the drum, the base of the channel extending substantially parallel with the face of the support and further characterized by having at least part of the band flexible so that the band as a whole is expansible, and channel means for rendering another part of the band rigid.

8. A brake characterized by a channel-shaped band-like friction means, the width of the base of the channel increasing from a central portion of the band to its ends and further characterized by reinforcing channel-shaped stampings telescoping the ends of the band to provide box-like ends.

ADIEL Y. DODGE.